G. STAUBER.
ELASTIC SHAFT COUPLING.
APPLICATION FILED MAR. 1, 1910.

988,742.

Patented Apr. 4, 1911.

Witnesses
A. E. Hathaway
S. Ford

Inventor
Georg Stauber
by R. Hadden
Attorney.

UNITED STATES PATENT OFFICE.

GEORG STAUBER, OF BERLIN, GERMANY.

ELASTIC SHAFT-COUPLING.

988,742.     Specification of Letters Patent.     Patented Apr. 4, 1911.

Application filed March 1, 1910. Serial No. 546,621.

*To all whom it may concern:*

Be it known that I, GEORG STAUBER, a subject of the German Emperor, residing at Berlin, W., in Germany, have invented a certain new and useful Improvement in Elastic Shaft-Couplings, of which the following is a specification.

This invention relates to elastic shaft-couplings. In couplings of this kind it has been found that distortion of the springs, where they engage the shafts or coupling members, causes friction accompanied by rapid wear, and in cases where a perfectly rigid engagement of the springs has been adopted, in order to prevent this friction, it has been found that deflection and relative displacement of the shafts is to some extent prevented, which is contrary to the purpose of elastic couplings.

The object of the present invention is to remove these disadvantages, and the invention consists in making the coupling by means of plate springs which are rigidly engaged with the coupling members in planes radial to the shafts, and are bent between the coupling members so that deflection and axial displacement of the coupled members can take place in any direction without distortion of the engaged parts of the springs.

The invention is illustrated in the accompanying drawings, in which—

Figure 3:
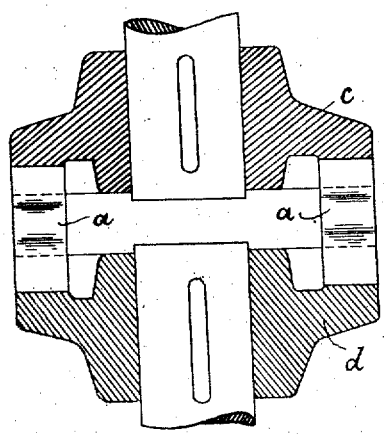
Figure 4:
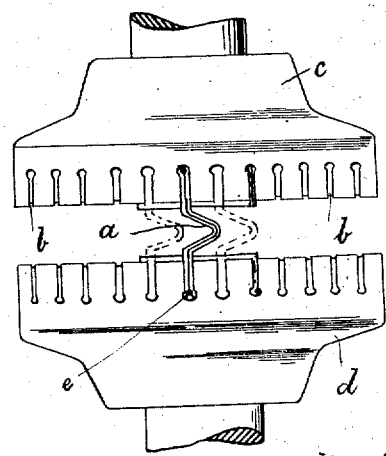
Figure 1:
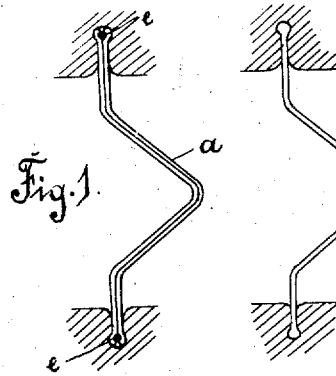
Figure 2:
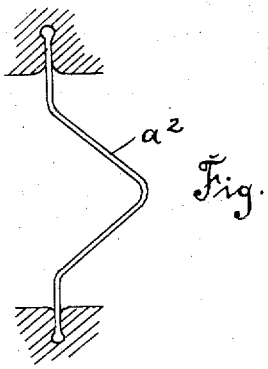
Figure 5:
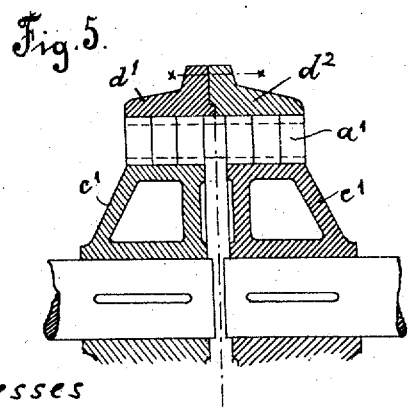

Figures 1 and 2 are side elevations of two forms of plate-springs showing also the coupled members in section and broken away. Fig. 3 is a sectional plan view of the improved coupling, and Fig. 4 shows the same in elevation. Fig. 5 is a cross-section of part of another coupling embodying the improvement, and Fig. 6 is an elevation thereof.

As shown in the drawings, the ends of the plate-springs $a$ are fitted into radial slots $b$ in coupling members $c$ and $d$. The springs are bent, between the coupling members which they connect, so that these members can be displaced relatively to each other without causing friction between the springs and the coupling members.

The spring $a$ shown in Fig. 1 consists of two parallel elastic plates the curved ends of which embrace pins $e$ in the enlarged bases of the slots $b$. The spring $a^2$ shown in Fig. 2 consists of a single elastic plate, enlarged at its ends. Figs. 3 and 4 show the springs connecting two flanges $c$ and $d$, the faces of which are in planes perpendicular to the axes of the shafts. Figs. 5 and 6 show the springs $a^1$ projecting radially outward from collars $c^1$ keyed to the shafts, the outer ends of the springs being fixed to two rings $d^1$, $d^2$ bolted together.

Figure 6:
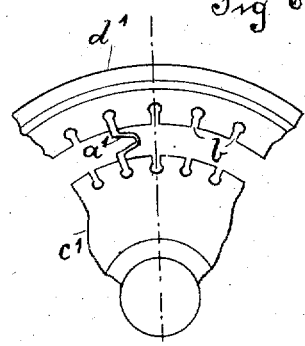

Both with the axial or longitudinal arrangement of the springs, as in Figs. 3 and 4, and with the radial arrangement, as in Figs. 5 and 6, the plate-springs are engaged with the coupling members in planes radial to the shafts, and the bent shape of the springs enables the shafts to be deflected and axially displaced relatively to each other without imposing strain on the attachment of springs, and without friction and distortion of those parts of the springs which are in engagement with the coupling members. The engagement being in radial planes, the strain is perfectly uniform, with drive in either direction.

What I claim as my invention and desire to secure by Letters Patent of the United States is:—

1. In an elastic shaft-coupling, in combination, two normally coaxial shafts, a coupling member on each shaft having slots extending parallel with the shafts and said slots having sockets at their bases, and plate springs connecting the coupling members, said springs extending substantially parallel with the shafts and having heads fitting normally-opposite sockets of said members and straight portions passing through the slots in said members, the straight portions of the springs extending considerably away from the members, and approximately V-shaped portions connecting the straight portions of said springs.

2. An elastic shaft coupling consisting of coupling members on the shafts connected by bent blade springs so that the spring parts engaged firmly by said coupling members are in planes radial to the shafts, the springs projecting straight from the faces of said coupling members before being bent, so that their bent part lies fully in the free space between said faces and allows an axial displacement, a distortion in both directions, and a relative deflection of the shafts without friction being created between the engaged parts of the springs and said coupling members.

In witness whereof I have signed this specification in the presence of two witnesses.

GEORG STAUBER.

Witnesses:
 HENRY HASPER,
 WOLDEMAR HAUPT.